United States Patent [19]

Kovach et al.

[11] 4,309,467
[45] Jan. 5, 1982

[54] COMPOSITION FOR USE IN HIGH-TEMPERATURE HYDROGEN-FLUORINE ENVIRONMENTS AND METHOD FOR MAKING THE COMPOSITION

[75] Inventors: Louis Kovach, Oak Ridge; Cressie E. Holcombe, Knoxville, both of Tenn.

[73] Assignee: The United States of America as represented by Department of Energy, Washington, D.C.

[21] Appl. No.: 180,251

[22] Filed: Aug. 22, 1980

[51] Int. Cl.$^3$ .................. C04B 35/50; C04B 35/58
[52] U.S. Cl. .................. 428/36; 501/96; 501/151; 501/152; 501/154; 331/94.5 G; 428/688; 264/85; 264/62; 264/332
[58] Field of Search .................. 106/73.2, 73.5, 73.1; 423/297, 263; 428/36, 688

[56] References Cited

U.S. PATENT DOCUMENTS 4,261,753  4/1981  Holcombe et al. .................. 106/73.2

Primary Examiner—Helen M. McCarthy
Attorney, Agent, or Firm—Earl L. Larcher; Stephen D. Hamel; Richard G. Besha

[57] ABSTRACT

The present invention relates to a composition particularly suitable for use as structural components subject to high-temperature environments containing gaseous hydrogen and fluorine. The composition of the present invention consists essentially of lanthanum hexaboride-molybdenum diboride with dispersed silicon. The composition is formed by hot pressing a powder mixture of lanthanum hexaboride as the major constituent and molybdenum disilicide. This composition exhibits substantial resistance to thermal shock and corrosion in environments containing hydrogen and fluorine gases at material surface temperatures up to about 1850° K. Upon exposure of the hot-pressed composition to high-temperature environments containing fluorine gases, a highly protective layer of lanthanum trifluoride containing dispersed molybdenum is formed on exposed surfaces of the composition.

5 Claims, 1 Drawing Figure

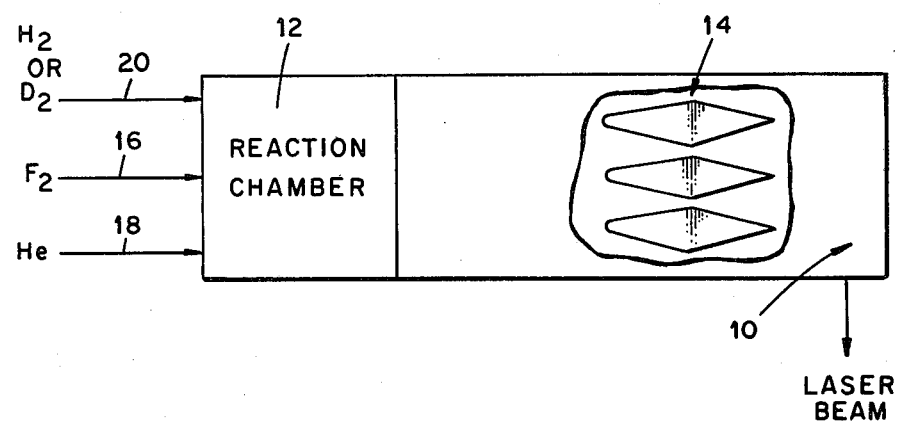

COMPOSITION FOR USE IN HIGH-TEMPERATURE HYDROGEN-FLUORINE ENVIRONMENTS AND METHOD FOR MAKING THE COMPOSITION

This invention was made as the result of a contract with the U.S. Department of Energy.

BACKGROUND OF THE INVENTION

The present invention is directed to a composition useful for fabricating structures subject to contact by high-temperature fluorine-containing gases.

The composition of the present invention is for use in the fabrication of hardware contactable by high-temperature fluorine-containing gases, as in a gas laser. This utilization of the subject composition is similar to that of the lanthanum hexaboride carbon composition disclosed in assignee's co-pending U.S. Pat. application Ser. No. 114,446(79) filed Jan. 2, 1980 now U.S. Pat. No. 4,261,753 and entitled "A Lanthanum Hexaboride Carbon Composition for Use in Corrosive Hydrogen-Fluorine Environments." Accordingly, this co-pending application is incorporated herein by reference for the purpose of describing the background of the subject invention and illustrating the state of the art.

SUMMARY OF THE INVENTION

It is the primary aim or objective of the present invention to provide a composition and method for fabricating the same that is useful as a structural material for hardware contactable by high-temperature fluorine-containing gases. The composition of the present invention consists essentially of lanthanum hexaboride, silicon-substituted lanthanum hexaboride, and molybdenum diboride. The composition is utilized in a compacted configuration of near theoretical density and exhibiting little or no detectable open porosity. The composition is prepared by hot pressing a powder mixture containing 76–92 mol. % lanthanum hexaboride and 8–24 mol. % molybdenum disilicide.

The composition of the present invention is particularly suitable for fabricating supersonic expansion nozzles for use in hydrogen fluoride lasers. A highly protective layer of lanthanum trifluoride containing dispersed molybdenum is formed on the surfaces of the nozzle when contacted by a high temperature stream of fluorine-containing gases and significantly inhibits the corrosion of the nozzle by the high-temperature fluorine-containing gases. The composition of the present invention is particularly characterized by being essentially resistant to thermal shock and fluorine corrosion at material surface temperatures up to about 1850° K.

As mentioned above, the composition of the present invention is particularly adaptable for use in gas lasing operations in which the lasing medium consists primarily of hydrogen fluoride. The composition is suitable for constructing hardware such as nozzles, reaction chambers and the like, which come in contact with the high-temperature fluorine and hydrogen fluoride. The material of the present invention is of a machinability easier than that of lanthanum hexaboride.

Other and further objects of the invention will be obvious upon an understanding of the illustrative embodiment and method about to be described or will be indicated in the appended claims, and various advantages not referred to herein will occur to one skilled in the art upon employment of the invention in practice.

DESCRIPTION OF THE DRAWING

The FIGURE is a somewhat schematic illustration representative of a hydrogen-fluoride laser system in which the composition of the present invention may be utilized for constructing the laser system hardware which are contactable by high-temperature fluorine-containing gases.

An illustrative embodiment has been chosen for the purpose of illustration and description of the invention. The embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DESCRIPTION OF THE INVENTION

The hydrogen fluoride chemical laser functions through the use of high-temperature hydrogen-fluoride molecules which have been chemically excited to a highly elevated vibrational state and then rapidly expanded through a supersonic nozzle to form the coherent simulated emission of light energy. As shown, in the accompanying drawing a gas laser system as generally indicated at 10 is provided with a reaction chamber 12 and a bank of converging, diverging supersonic nozzles 14. Fluorine gas is introduced into the reaction chamber 12 together with an inert gas, such as helium or the like, through conduits 16 and 18, respectively. Hydrogen or deuterium is introduced into the reaction chamber 12 through conduit 20. Within the chamber 12 the fluorine exothermically reacts with the hydrogen or deuterium at approximately ambient pressure to provide a gaseous environment within the reaction chamber 12 at a temperature within the range of about 1650°–2850° K. depending upon the quantity of helium diluent employed. At this temperature molecules of hydrogen fluoride become vibrationally excited and flow into an optical laser cavity through an array of the nozzles 14. The rapid expansion and acceleration of the excited molecules through the supersonic nozzles create the lasing action. The configuration of the nozzles 14 or other laser hardware does not form the basis of the present invention as the composition of the present invention may be used in laser systems of significantly different configurations.

In order for a hydrogen-fluoride laser to properly function, a high-temperature fluorine gas stream at a temperature range of about 1400°–1850° K. is desirable. The general objective of the present invention as pointed out above is to provide a composition from which nozzles and other structural hardware of such a gas laser may be constructed, since this material or composition is particularly suitable to withstand the high-temperature fluorine-containing gases, the thermal stress and shock conditions encountered in a gas laser, as well as the ablation and corrosion caused by the fluorine-containing gas.

The composition of the present invention consists essentially of about 52–84 mol. % lanthanum hexaboride, about 8–24 mol. % silicon-substituted lanthanum hexaboride, and about 8–24 mol. % molybdenum diboride. The composition is prepared by hot pressing a powdered mixture containing about 76–92 mol. % lanthanum hexaboride and about 8–24 mol. % molybdenum disilicide. The particle size of the lanthanum hexaboride is about 5 to 44 micrometers and the particle size of the molybdenum disilicide is also in the range of about 5 to 44 micrometers. These powders are of a purity greater than about 99%. The composition is of a density greater than 90% of the theoretical density of the components in the composition.

The powder composition is subjected to a compacting process which is essentially a reactive hot-pressing operation wherein the molybdenum disilicide reacts with an equivalent molar amount of the lanthanum hexaboride to produce molybdenum diboride and silicon-substituted lanthanum diboride ($LaX_6$) where X is primarily made up of boron but also includes silicon. The hot-pressing operation is preferably achieved in an argon environment and utilizes a graphite die system with the graphite dies coated with a slurry of boron nitride to inhibit reaction between the composition constituents and the graphite. The hot pressing should be achieved at a temperature in the range of about 2175° K. to about 2275° K. since molybdenum silicide ($MoSi_2$) melts at 2300° K. The pressure utilized for the hot-pressing operation is in the range of about 3000 to 4500 psi. The composition of the present invention suggests the resultant material was comprised primarily of lanthanum hexaboride and molybdenum diboride containing silicon which was dissolved and dispersed through the composition during the hot-pressing operation. Upon subjecting the composition to an environment containing gaseous fluorine at a surface temperature greater than about 1400° K., a layer of highly viscous lanthanum trifluoride with dispersed molybdenum is formed on the surface of the composition. This hard, adherent layer protects the composition from corrosion and ablation when contacted by hydrogen and by fluorine-containing gases at high temperatures. This protective layer is of a thickness in a range of about 0.004 to 0.010 inch, typically 0.005 inch. The dispersed molybdenum is believed to be the primary reason for the hardness, high viscosity effects, and adherence of the layer on the composition. A relatively low vapor pressure of this lanthanum trifluoride molybdenum layer is believed to account for the enhanced protection of the composition which includes a significantly low rate of corrosion of material in high-temperature environments containing gaseous fluorine.

In order to provide a more facile understanding of the present invention, examples are set forth below illustrative of the fabrication of the composition of the present invention and the results of tests run upon the composition pointing out the characteristics thereof.

EXAMPLE I

A composite of the subject material was prepared from a mixture of powder having a total weight of 83 grams. The mixture contained 83.6 mol. % lanthanum hexaboride and 16.4 mol. % molybdenum disilicide. The particle size of the powders was less than 44 micrometers. The powder blend was hot pressed in a boron-nitride-coated graphite die for one hour in an argon atmosphere at a temperature in the range of 2223°–2263° K. at a pressure in the range of 4000–4500 psi. The resulting cylindrical pellet was of a diameter of 1 inch and a height of 1.2 inches. The hot-pressed cylinder had a bulk density of 4.86 grams per cubic centimeter which corresponds to 97% of the theoretical density of the original mixture. Mercury intrusion porosimetry indicated that the cylinder had no open porosity.

X-ray diffraction analysis indicated that the lanthanum hexaboride forms a major phase or constituent of the composition while the molybdenum diboride provided an intermediate constituent. Spark source mass spectrometry indicated the high concentration of silicon throughout the composition. This silicon was apparently dissolved in one or both of the lanthanum hexaboride and in the molybdenum diboride. The silicon in the molybdenum disilicide was replaced partially or completely with boron from the lanthanum hexaboride. This silicon from the molybdenum disilicide, in turn, replaced the boron taken from the lanthanum hexaboride to provide the composition with the silicon-substituted lanthanum hexaboride.

The cylinder was subjected to a gaseous mixture containing 17.5–26.0 vol. % fluorine, 61.0–73.75 vol. % helium, and 8.75–13.0 vol. % hydrogen to provide flame temperatures in the range 1700°–2215° K. The cylinder was heated to a surface temperature in the range of about 1400°–1483° K. (or approximately 1585° K. including emissivity correction) for 5 minutes in the gaseous mixture. During this exposure, a hard protective coating of the lanthanum trifluoride and dispersed molybdenum metal was formed on the cylinder. This layer had a thickness of about 0.005 inch. During this exposure to the high temperature fluorine-containing gases, the cylinder weight decreased only about 0.4 wt. %. X-ray diffraction indicated that the lanthanum trifluoride was the major constituent of the layer while the molybdenum metal dispersed therein formed the minor constituent. The coating appearance was black on top and white elsewhere.

EXAMPLE II

A second cylinder of the composition of the present invention was fabricated by using a powder blend and hot-pressing operation similar to that set forth above in Example I. The second cylinder was introduced into an environment containing 22.2–29.6 vol. % fluorine, 55.6–66.7 vol. % helium, and 11.1–14.8 vol. % hydrogen to provide a gaseous mixture with flame temperatures from 2000°–2395° K. The surface of the cylinder was heated to 800° C. in 25 seconds. The temperature of the cylinder surface appeared to be uniform. This cylinder was found to be resistant to thermal shock and had a relatively high thermal conductivity value since the temperature throughout the cross section of the cylinder appeared to be essentially uniform. The coating or layer of lanthanum trifluoride and molybdenum formed some melted regions at 1798° K. Even though a final surface temperature of 1855° K. (which includes a correction factor for emissivity of 0.4) was reached, the coating was not completely melted. A rapid flowing of the protective coating and the heretofore characteristic surge in the surface temperatures of the cylinder signifying failure of the coating did not occur. Although part of the nickel support used to hold the cylinder in the high-temperature gas stream underwent some melting (mp=1725° K.), the cylinder surface experienced a surface temperature of greater than 1600° K. for 5 minutes and suffered a weight loss of only 1.7% with only a very slight change in dimensions. This cylinder equaled or exceeded the performance of pure lanthanum hexaboride in such environment.

It will be seen that the composition of the present invention is particularly suitable for structural components utilized in high-temperature fluorine-containing gases, such as in hydrogen fluoride laser systems. The composition of the present invention provides such laser systems with an operating temperature range up to about 1800° K. so as to considerably increase the efficiency of the laser system. While the composition of the present invention is primarily directed to applications in hydrogen fluoride lasers, it will appear clear that the composition may be used for structural components in isotopic separation facilities processing uranium hexafluoride or a torch using a hydrogen fluorine flame.

What is claimed is:

1. A composition for use as a structural material in a high-temperature gaseous-fluorine containing environment, said composition consisting essentially of lanthanum hexaboride,, silicon-substituted lanthanum hexaboride and molybdenum diboride, said composition being characterized by being essentially resistant to thermal shock and corrosion from the gaseous fluorine at material surface temperatures greater than 1400° K.

2. The composition claimed in claim 1 wherein the major constituent of the composition is lanthanum hexaboride and wherein the molbydenum diboride is an intermediate constituent.

3. A composition as claimed in claim 1 wherein the composition consists of 52–84 mol. % lanthanum hexaboride, 8–24 mol. % silicon-substituted lanthanum hexaboride and 8–24 mol. % molybdenum diboride and wherein the composition is characterized by exhibiting essentially no open porosity and a theoretical density greater than about 90% of the theoretical density of the components in the composition.

4. A supersonic nozzle for a hydrogen fluoride laser system formed of the composition claimed in claim 1, said nozzle having a layer of lanthanum trifluoride containing dispersed molybdenum on surfaces thereof contacted by a high temperature stream of fluorine-containing gas.

5. A supersonic expansion nozzle as claimed in claim 3 wherein said layer is of a thickness in a range of about 0.004 to 0.010 inch.

* * * * *